United States Patent [19]
Otake

[11] Patent Number: 5,995,390
[45] Date of Patent: Nov. 30, 1999

[54] POWER SUPPLY CONTROL DEVICE

[75] Inventor: Tetushi Otake, Tokyo, Japan

[73] Assignee: Toko, Inc., Tokyo, Japan

[21] Appl. No.: 09/241,499

[22] Filed: Feb. 1, 1999

Related U.S. Application Data

[62] Division of application No. 08/755,979, Nov. 25, 1996, Pat. No. 5,907,482.

[30] Foreign Application Priority Data

Nov. 30, 1995 [JP] Japan .................................... 7-334241
Dec. 8, 1995 [JP] Japan .................................... 7-345936
Jan. 12, 1996 [JP] Japan .................................... 8-21835

[51] Int. Cl.$^6$ .................................................. H02M 1/12
[52] U.S. Cl. ............................................. 363/39; 363/41
[58] Field of Search .............................. 363/34, 39, 40, 363/41, 65, 71

[56] References Cited

U.S. PATENT DOCUMENTS

| 5,218,522 | 6/1993 | Phelps et al. ........................ 363/124 |
| 5,414,615 | 5/1995 | Kumar et al. ...................... 363/41 X |
| 5,515,257 | 5/1996 | Ishii ..................................... 363/21 |
| 5,537,305 | 7/1996 | Colotti ................................. 363/39 |

FOREIGN PATENT DOCUMENTS

| 2-142355 A | 5/1990 | Japan . |
| 7-087732 | 3/1995 | Japan . |
| 7-23986 | 5/1995 | Japan . |
| 7-264866 | 10/1995 | Japan . |
| 7-264867 | 10/1995 | Japan . |

*Primary Examiner*—Y. J. Han
*Attorney, Agent, or Firm*—Frishauf, Holtz, Goodman, Langer & Chick, P.C.

[57] ABSTRACT

A power supply control device, by which a plurality of switching power supply circuits of different properties are operated under switching conditions respectively fitted therefor simultaneously with the prevention of an occurrence of what is called a low-frequency switching beat phenomenon, thereby achieving the miniaturization and the increasing of the efficiency of a power supply unit. To synchronize the timing of switching operations among control systems or units of the power supply control device, the control device of the multi-channel type or the control device having a master-slave function is used. Further, a frequency divider circuit or a frequency multiplier circuit is connected to a comparator of such a control device. Thereby, although synchronizing the timing among the switching operations, a plurality of pulse output signals of different frequencies are outputted from the control systems or the control units. Incidentally, a frequency divider circuit or a frequency multiplier circuit may be added to an oscillation circuit of the control device, instead of connecting the frequency divider circuit or the frequency multiplier circuit to the comparator.

3 Claims, 10 Drawing Sheets

POWER SUPPLY CONTROL DEVICE

This application is a Divisional of Ser. No. 08/755,979 filed Nov. 25, 1996 now U.S. Pat. No. 5,907,432.

BACKGROUND OF THE INVENTION

1. Field of the Invention

The present invention generally relates to a power supply control device for driving a plurality of switching power supply circuits which are incorporated in a power supply unit and have different properties, for example, the ordinary rectification type switching power supply circuits and the synchronous rectification type switching power supply circuit by synchronizing the operation timing among the circuits.

2. Description of the Related Art

In recent years, electronic devices have been miniaturized, while the performance thereof and the range of functions thereof have been enhanced. Thus, a power supply unit to be incorporated in an electronic device has a plurality of switching power supply circuits respectively corresponding to loads (namely, machines and circuits) of different properties. Here, note that generally, the pulse width modulation type control integrated circuits are used for controlling the driving of the switching power supply circuits and that a power supply unit has a number of control systems which corresponds to the number of the loads, namely, the number of the switching power supply circuits.

Meanwhile, when operating a plurality of switching power supply circuits in a same power supply unit independent of one another, an interference phenomenon (so called a switching beat), which is based on a plurality of switching operations, sometimes occurs in the power supply unit. This is due to the fact that, for example, when two switching power supply circuits operate at switching frequencies f1 and f2, respectively, a low-frequency switching beat corresponding to the difference (f1–f2) between the two switching frequencies results.

In order to prevent an occurrence of this low-frequency switching beat phenomenon, the conventional power supply unit synchronizes the timing of switching operations among the plurality of switching power supply circuits that undergo independent output control. As practical examples of this, there have been employed the following two means.

(1) Namely, a first means adapted to employ a multichannel type control device which uses a unified reference waveform signal (namely, a triangular-wave voltage) as those of a plurality of control systems constituted in the control device.

(2) Further, a second means adapted to employ control devices, each having a master-slave function, and to use one of the control devices as a master control device and operate this control device at a predetermined operation timing and at a predetermined oscillation frequency, and to use the rest of the control devices as slave control devices which causes the slave control devices to receive a synchronization signal from the master control device and operate at an operation timing synchronized with the master control device and at the same oscillation frequency as that of the master control device.

Figure 1:
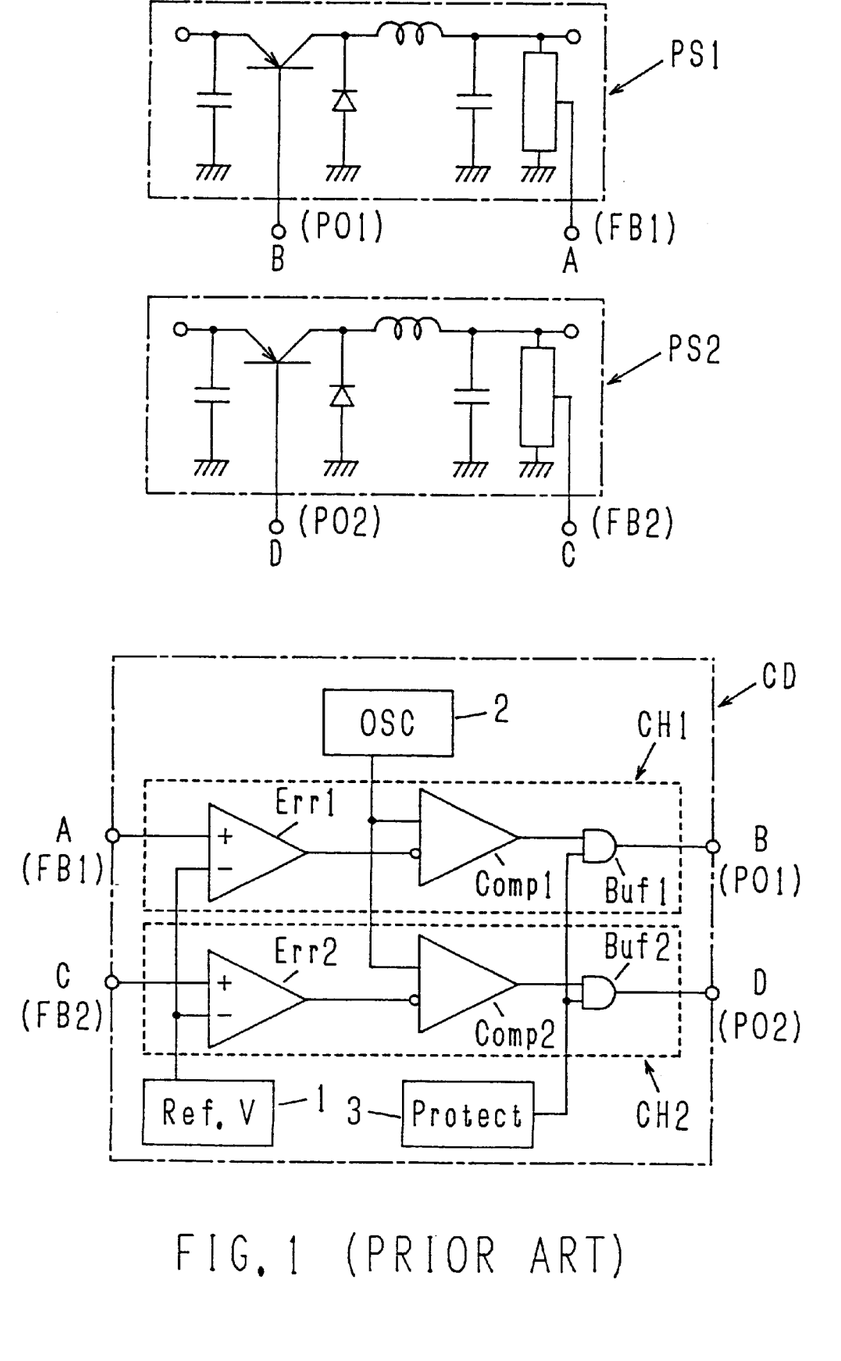
FIG. 1 is a block diagram showing a conventional power supply control device of the multi-channel type and conventional switching power supply circuits thereof.

FIG. 1 schematically illustrates the control device corresponding to the first means, which is incorporated with the intention of preventing an occurrence of a low-frequency switching beat phenomenon, and a power supply unit employing this control device.

The control device CD of FIG. 1 is roughly composed of a first control system CH1, a second control system CH2, a reference voltage supply 1, an oscillation circuit 2 and a protective circuit 3.

Here, the reference voltage supply 1 is adapted to output a highly-stable voltage as a reference voltage level. Further, the oscillation circuit 2 is operative to output a triangular-wave voltage at a predetermined oscillation frequency. Moreover, the protective circuit 3 is operative to output an operation stopping signal so as to protect the systems from a short in the output circuit and to prevent an occurrence of a malfunction when a low level signal is input.

The reference voltage supply 1, the oscillation circuit 2 and the protective circuit 3 are shared by the control systems.

The control system CH1 is used for driving and controlling a first power supply circuit PS1 and is basically composed of an error amplifier Err1, a comparator Comp1 and an output buffer 1. An operation of this control system CH1 is performed as follows. Namely, first, this control system CH1 receives a feedback signal FB1 from the switching power supply circuit PS1. Then, a voltage level represented by the received feedback signal FB1 is compared with a reference voltage ($V_{REF}$) in the error amplifier Err1, so that an error signal is obtained therein. Subsequently, this error signal is compared with a triangular-wave voltage in the comparator Comp1, which generates a pulse output signal PO1 having on-duty in accordance with an output voltage thereof. This pulse output signal PO1 is supplied to a switching device of the switching power supply circuit PS1. Thereby, the switching power supply circuit PS1 is driven and controlled in such a manner that an output voltage thereof remains constant.

The control system CH2 is used for driving and controlling a second power supply circuit PS2 and is basically composed of an error amplifier Err2, a comparator Comp2 and an output buffer 2. An operation of this control system CH2 is similar to the operation of the control system CH1. Thus, the description of the operation of the control system CH2 is omitted.

Here, the protective circuit 3 is adapted to output an operation stopping signal when an abnormality occurs in the switching power supply circuits PS1, PS2. When receiving this operation stopping signal, the output buffers Buf1, Buf2 prohibit pulse output signals PO1, PO2 from passing therethrough. Thus, an operation of the switching power supply circuit PS1 is stopped.

Figure 2:
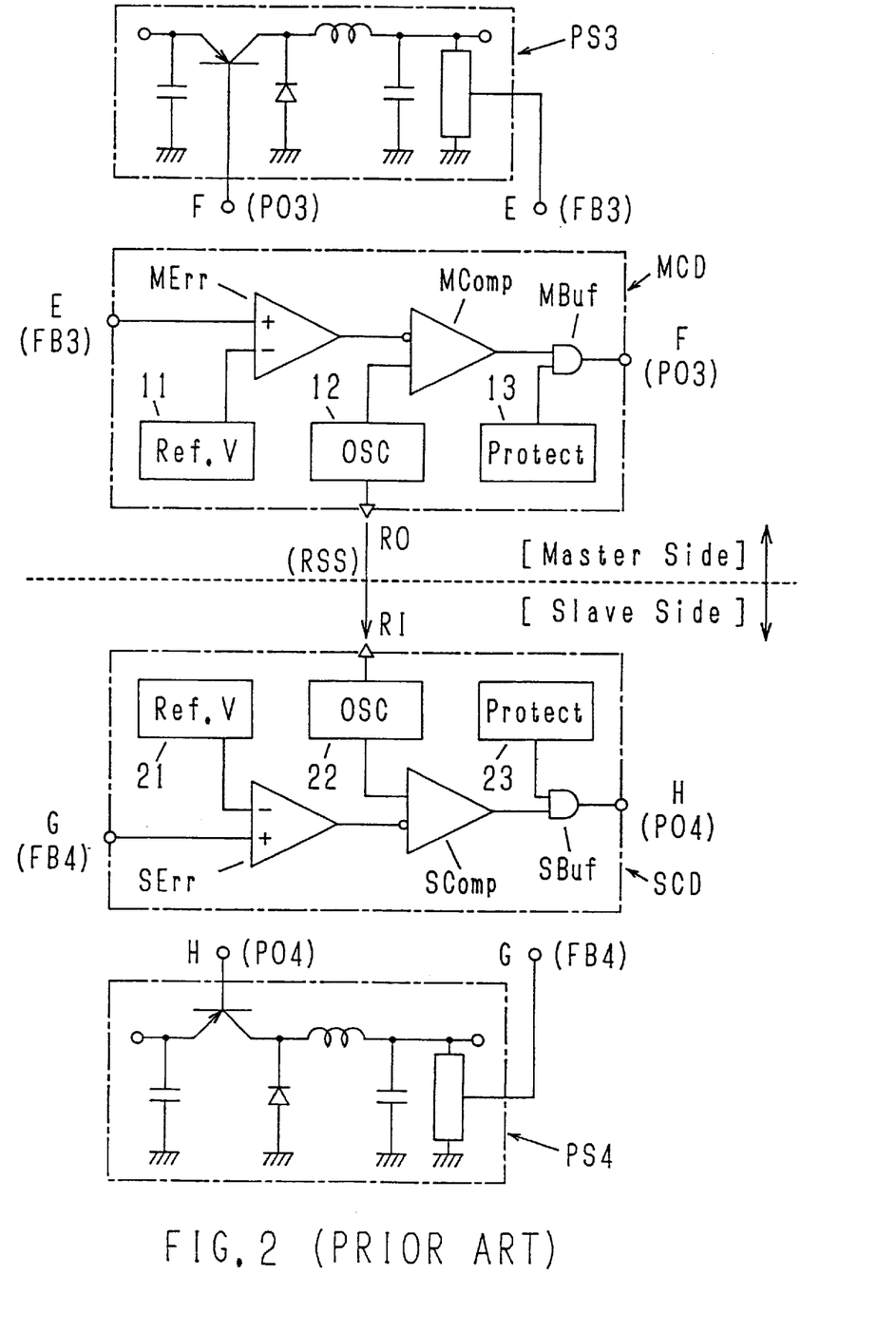
FIG. 2 is a block diagram showing a conventional power supply control device, which has a master-slave function, and conventional switching power supply circuits thereof.

Referring next to FIG. 2, there is schematically shown control devices corresponding to the second means and a power supply unit having these control devices, which are constituted for the purpose of preventing an occurrence of low-frequency switching beat phenomenon.

In the power supply unit of FIG. 2, two switching power supply circuit PS3 and PS4 are driven and controlled by control devices MCD and SCD, respectively, independent of each other.

Here, the control device MCD is composed of: a control system, which consists of an error amplifier MErr, a comparator MComp and an output buffer MBuf; a reference voltage supply 11 for outputting a reference voltage or signal; an oscillation circuit 12; and a protective circuit 13. An operation of this control device MCD is performed as follows. Namely, the control device MCD receives a feedback signal FB3 from the switching power supply circuit PS3. Subsequently, a voltage represented by this feedback signal FB3 is compared with a reference voltage ($V_{REF}$) in the error amplifier MErr, so that an error signal is obtained.

Then, the comparator MComp compares the error signal with a triangular-wave signal sent from the oscillation circuit 12 and further outputs a pulse output signal PO3 having on-duty in accordance with an output voltage thereof. This pulse output signal PO3 is supplied to a switching device of the switching power supply circuit PS3. Thereby, the switching power supply circuit PS3 is driven and controlled in such a manner that an output voltage thereof remains constant.

Here, the oscillation circuit 12 is operative to output a synchronization signal RSS (which is generally a voltage that is the same as the triangular-wave voltage to be supplied to the comparator Comp1) to an external circuit simultaneously with supplying a triangular-wave voltage to the comparator MComp.

Further, the control unit SCD is composed of: a control system which consists of an error amplifier SErr, a comparator SComp and an output buffer SBuf; a reference voltage supply 21; an oscillation circuit 22; and a protective circuit 23. An operation of this control device SCD is fundamentally the same as of the control device MCD. The control device SCD, however, is different from the control device MCD, in which the oscillation circuit 12 of the control device MCD produces a triangular-wave voltage at independent operation timing and at the predetermined oscillation frequency, in that the oscillation circuit 22 of the control device SCD receives a synchronization signal (RSS) from the control device MCD and operates in such a way as to generate a triangular-wave voltage whose operation timing and oscillation frequency are the same as those of the signal produced by the oscillation circuit 12.

As is understood from this, in the case of the power supply unit of FIG. 2, the control device MCD functions as the master control device, while the control device SCD functions as the slave control device.

The reduction in size of electronic devices in recent years has resulted in great demand for the miniaturization of power supply units. When miniaturizing the power supply units, the inductors and the capacitors of the switching power supply circuits PS3 and PS4 are first miniaturized. At that time, the switching frequency of the switching device is set at a high value. This switching frequency is determined according to the oscillation frequency of a triangular-wave voltage output by the oscillation circuit 2, 12 or 22 of the control device CD, MCD or SCD. Although the generally used oscillation frequency is several hundreds kilohertz (kHz), an oscillation circuit which provides an oscillation frequency of several megahertz (MHz), is currently available.

Meanwhile, because of the fact that batteries are used in electronic devices as a power source, the reduction in size of the electronic devices to the portable size thereof also results in great demand for a reduction in the power consumption of the power supply units. A problem to be solved by the reduction in power consumption of the power supply units to low levels is the improvement of the efficiency of each of the switching power supply circuits. Switching power supply units of the synchronous rectification type are available as means for improving the efficiencies of the switching power supply circuits.

This switching power supply circuit of the synchronous rectification type employs a transistor as a rectifying device, instead of a diode. A loss produced in the transistor due to a collector-to-emitter voltage in an on-state is less than a loss produced in the diode owing to a forward voltage (drop). Thus, theoretically, a loss produced in the rectifying device is reduced. Thereby, the efficiency of the switching power supply circuit can be enhanced. However, in the case of actually using a transistor as a rectifying device, losses are produced when on/off operations thereof are performed. As the switching frequency becomes higher, losses abruptly increase. As a result, in the case of switching frequencies of a certain range, a loss produced in the switching power supply circuit of the synchronous rectifying type using a transistor is more than a loss produced in the switching power supply circuit of the ordinary type using a diode. Incidentally, it is known that in the case of using semiconductor devices already on the market, the limit of the switching frequency for increasing the efficiency of the switching power supply circuit by employing the circuit of the synchronous rectification type is about 200 kHz.

Moreover, in the case of the circuit of the synchronous rectifying type using a transistor as the rectifying device, there is the necessity of complementarily driving the transistor, which is employed as the rectifying device, in synchronization with the operation of the switching device. Thus, the switching power supply circuits further require circuits and components therefor.

Therefore, in the case of the switching power supply circuit employing the synchronous rectification, the size of the circuit is large in compensation for the increasing of the efficiency thereof, in comparison with the case of employing the switching power supply of the ordinary rectification type. Consequently, in the former case, the size of the power supply unit is large.

To attain the miniaturization of the power supply unit and the increasing of the efficiency thereof by achieving a good balance therebetween, it is considered as necessary to suitably arrange the switching power supply circuit of the ordinary rectification type and the switching power supply circuit of the synchronous rectification type in the unit according to the characteristics of loads. For example, the miniaturization of the power supply unit is achieved by applying the switching power supply circuit of the ordinary rectification type to a load whose power consumption is small, while the high efficiency of the power supply unit is realized by applying the switching power supply circuit of the synchronous rectification type to a load whose power consumption is large.

However, in the actual case of using the switching power supply circuit of the ordinary rectification type together with the switching power supply circuit of the synchronous rectification type, the conventional power supply control device of FIG. 1 has a problem in that pulse output signals supplied from each of the control systems to the switching power supply circuits has only one kind of a pulse frequency (a switching frequency).

The miniaturization of the power supply unit requires a high switching frequency, whereas the increasing of the efficiency thereof (synchronous rectification) requires a lower switching frequency. Namely, when the pulse output signals has only one kind of the pulse frequency under this condition in which the tendencies of the frequencies respectively required by the miniaturization and the increasing of the efficiency, respectively, are opposed to each other, one of the miniaturization and the increasing of the efficiency has to be traded off for the other thereof.

Similarly, in the case of the power supply control devices (MCD and SCD) of the master-slave type as shown in FIG. 2, in order to prevent generation of a low frequency switching beat, the operation-timing and oscillation-frequency of a triangular-wave voltage outputted from the slave control device (SCD) are set in such a manner as to be the same as those of a triangular-wave voltage outputted from the master control device (MCD). Thus, the same problems as in the case of the power supply control circuit of FIG. 1 comes up. Consequently, one of the miniaturization and the increasing of the efficiency has to be traded off for the other thereof.

SUMMARY OF THE INVENTION

It is, accordingly, an object of the present invention to provide a power supply control device by which a plurality of switching power supply circuits of different properties, which include those of the ordinary rectification type and the synchronous rectification type, can be operated under switching conditions respectively suitable therefor, thereby achieving a good balance between the miniaturization of a power supply unit and the increasing of the efficiency thereof.

To achieve the foregoing object, in accordance with the present invention, there is provided a power supply control device of the multi-channel type/pulse-width modulation type that has a plurality of control systems in such a way as to control a plurality of power supply circuits independently of one another and causes the plurality of control systems to share oscillation means for supplying a signal to the control systems and synchronizes pulse output signals of the control systems with one another. Further, the pulse frequency of a pulse output signal of at least one of the plurality of power supply control devices is divided by frequency divider means into a low frequency which is 1/n of a pulse frequency of other control systems ("n" is an integer). Alternatively, the pulse frequency of a pulse output signal of at least one of the plurality of power supply control devices is multiplied by frequency multiplier means into a high frequency which is n times a pulse frequency of other control systems.

Further, in accordance with the present invention, there is provided another power supply control device having a master-slave function, which is used as a master control device, which is adapted to output a pulse output signal at an independent operation timing and at a predetermined pulse frequency and control at least one of a plurality of power supply circuits placed in juxtaposition with one another, or a slave control device which receives a synchronization signal from a master control device and outputs a pulse output signal at an operation timing and at a pulse frequency in synchronization with the master control device and control a power supply circuit other than the master control device. This power supply control device is provided with frequency divider means or frequency multiplier means and is adapted to output a pulse output signal, whose pulse frequency is a low frequency, which is 1/n of the frequency of a pulse output signal outputted in response to a synchronization signal, or a high frequency which is n times the frequency of a pulse output signal outputted in response to a synchronization signal.

A first practical embodiment of the present invention is a power supply control device of the multi-channel type having a plurality of control systems, at least one of which has a frequency divider circuit and outputs a pulse output signal, whose pulse frequency is a low frequency that is 1/n of the frequency of a pulse output signal of another control system.

A second practical embodiment of the present invention is a power supply control device of the multi-channel type having a plurality of control systems, at least one of which has a frequency multiplier circuit and outputs a pulse output signal, whose pulse frequency is a high frequency that is n times the frequency of a pulse output signal of another control system.

Incidentally, the frequency divider circuit and the frequency multiplier circuit are provided at output terminals of comparators or at input terminals, to which reference waveform signals are applied, of comparators in the control system.

In the case of a third practical embodiment of the present invention, a frequency divider means or a frequency multiplier means is added to an oscillation circuit provided in a control device. Thereby, a high-frequency reference waveform signal and a low-frequency reference waveform signal are obtained. By supplying the reference waveform signals to control systems, a control system, which outputs a high-frequency pulse output signal, and another control system, which outputs a low-frequency pulse output signal, are formed therein.

A fourth practical embodiment of the present invention is a power supply control device having a master-slave function, in which a frequency divider or a frequency multiplier is connected to comparison means of a master control unit or comparison means of a slave control unit. Further, high-frequency and low-frequency pulse output signals, whose pulse frequencies are at a ratio of 1 to n, are obtained from the master and slave control units, respectively.

A fifth practical embodiment of the present invention is a power supply control device having a master-slave function, in which a frequency divider or a frequency multiplier is connected to an oscillation circuit of a master control unit or an oscillation circuit of a slave control unit. Further, high-frequency and low-frequency pulse output signals, whose pulse frequencies are at a ratio of 1 to n, aria obtained from the master and slave control units, respectively.

In the case of a sixth practical embodiment of the present invention, a frequency divider means or a frequency multiplier means is provided at an oscillation circuit in a master control device. Thereby, first and second synchronization signals respectively having high and low frequencies, which are at a ratio of 1 to n, are generated. Further, high-frequency and low-frequency pulse output signals, whose pulse frequencies are at a ratio of 1 to n, are respectively obtained from master and slave control devices, which operate in response to the synchronization signal, or from slave control devices which also operate in response to the synchronization signal.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DESCRIPTION OF THE PREFERRED EMBODIMENTS

Hereinafter, the preferred embodiments of the present invention will be described in detail by referring to the accompanying drawings.

Figure 3:
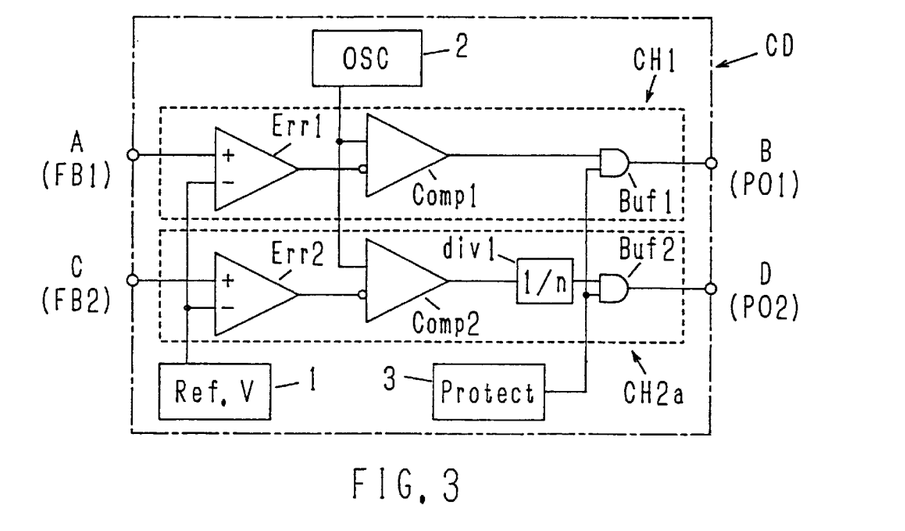
FIG. 3 is a block diagram showing a first embodiment of the present invention, in which a frequency divider circuit is connected to a control system of a power supply control device of the multi-channel type.

FIG. 3 is a block diagram illustrating the first embodiment of the present invention, namely, a power supply control device embodying the present invention, which can drive a plurality of switching power supply circuits of different properties, for example, switching power supply circuits of the ordinary rectification type and those of the synchronous rectification type under the conditions respectively suitable therefor.

In the power supply control device CD of FIG. 3, a control system CH2a has a frequency divider circuit div1 in addition to an error amplifier Err2, a comparator Comp2 and an output buffer Buf2.

Here, the frequency divider circuit div1 performs a frequency division on the switching frequency of a pulse output signal generated in the comparator Comp2. As a result, the switching frequency of a pulse output signal PO2 outputted from a terminal pin D of the control system CH2a is lower than that of a pulse output signal PO1 outputted from a terminal pin B of the control system CH1.

Such a power supply control device CD is used, namely, a switching power supply circuit of the ordinary rectification type is driven and controlled by the control system CH1, and a switching power supply circuit of the synchronous rectification type is driven and controlled by the control system CH2. Then, the switching power supply circuit of the ordinary rectification type can be miniaturized by increasing or raising the switching frequency thereof, while the efficiency of the switching power supply circuit of the synchronous rectification type can be enhanced by decreasing or lowering the switching frequency. Further, the two pulse output signals are different in switching frequency from each other, whereas the operations thereof are performed at the same operation timing. Thus, there is no fear that a switching beat occurs.

In the case of miniaturizing the power supply unit by raising or increasing the oscillation frequency of a triangular-wave voltage outputted from the oscillation circuit in the power supply unit in which the switching power supply circuits of the ordinary rectification type and the synchronous rectification type are placed in juxtaposition, the overall efficiency of the power supply unit can be greatly improved by the frequency divider circuit.

Incidentally, in the case of the power supply control device CD of FIG. 3, the frequency divider circuit div1 is connected to an output terminal of the comparator Comp2 so as to perform the frequency division on a pulse output signal generated in the comparator Comp2. In contrast, even in the case that the output terminal of the comparator Comp2 is connected to the output buffer Buf2 and further, the frequency divider circuit is connected to an output terminal of the output buffer Buf2, similar effects or advantages can be obtained.

Figure 4:
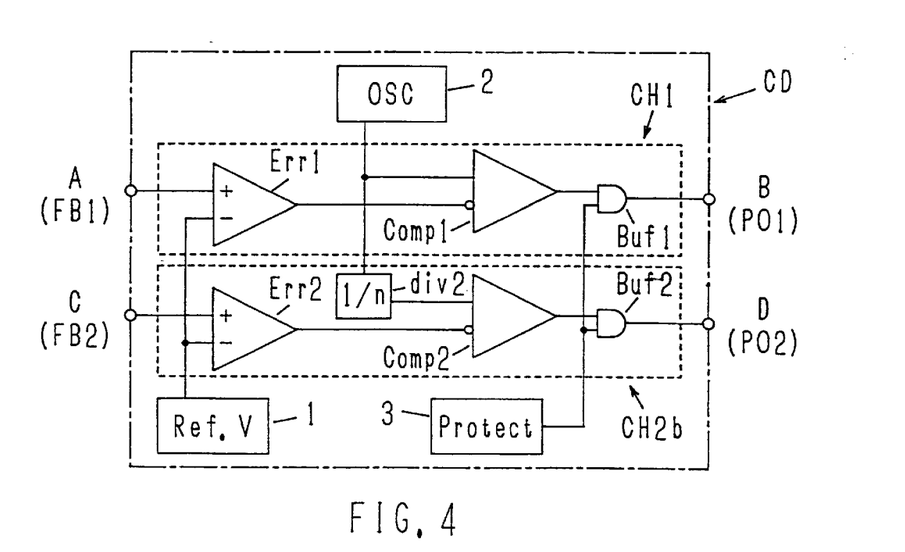
FIG. 4 is a block diagram showing a second embodiment of the present invention, in which a frequency divider circuit is connected to a control system of a power supply control device of the multi-channel type.

Referring next to FIG. 4, there is shown the second embodiment of the present invention, namely, another power supply control device embodying the present invention. In the case of a control system CH2b of the control device CD of FIG. 4, a frequency divider circuit div2 is connected to an input terminal, at which a triangular-wave voltage is received, of a comparator Comp2, differently from the case of the control system CH2a of the control device CD of FIG. 3, in which the frequency divider circuit div1 is connected to an output side or terminal of the comparator Comp2.

In the case of the second embodiment, the frequency division is performed on the frequency of the triangular-wave voltage, which is inputted to the comparator Comp2, by the frequency divider circuit div2. Thus, the frequency of a pulse output signal PO2 outputted from a terminal pin D of the control system CH2b is lower than that of the pulse output signal (PO1) outputted from the terminal pin B of the control system CH1.

Therefore, the operation and effects of the control system CH2b of FIG. 4 are similar to those of the control system CH2a of FIG. 3. Consequently, when the switching power supply circuit of the ordinary rectification type is driven and controlled by the control system CH1 and the switching power supply circuit of the synchronous rectification type is driven and controlled by the control system CH2b, both of the miniaturization of the power supply unit and the increasing of the efficiency thereof can be achieved simultaneously.

Figure 5:
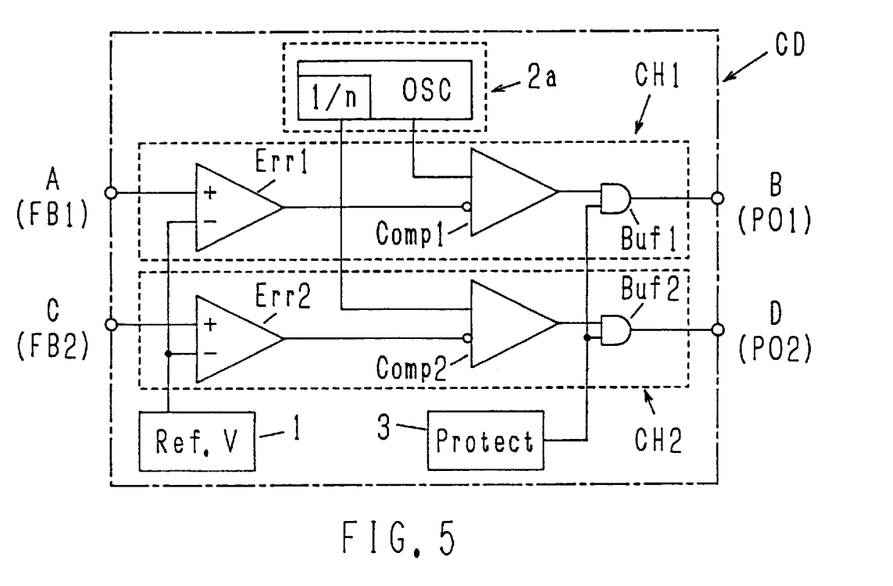
FIG. 5 is a block diagram showing a third embodiment of the present invention, in which a frequency divider means is provided in an oscillation circuit of a power supply control device of the multi-channel type.

FIG. 5 illustrates the third embodiment of the present invention, namely, still another power supply control device. The frequency divider circuits (div1 and div2) are connected to the control systems (CH2a and CH2b), respectively, in the case of the power supply control devices of FIGS. 3 and 4, while the frequency divider means is added to the oscillation circuit 2a shared by the control systems (CH1 and CH2) in the case of the control device of FIG. 5. Thus, the control device of FIG. 5 is adapted so that two reference waveform signals, namely, a high-frequency triangular-wave voltage and a low-frequency triangular-wave voltage are obtained in the oscillation circuit 2a. By inputting a high-frequency triangular-wave voltage to the comparator Comp1 of the control system CH1 and further inputting a low-frequency triangular-wave voltage to the comparator Comp2 of the control system CH2, the control device CD of FIG. 5 can obtain substantially the same operations and effects as of the control device CD of FIG. 4.

Incidentally, there are various circuit configurations (or systems) of the oscillation circuit for outputting a triangular-wave voltage. Generally, a process consisting of steps of generating a rectangular-wave voltage from a d.c. voltage and converting the rectangular-wave voltage to the triangular-wave voltage is performed. Thus, there have been devised two means for obtaining a low-frequency triangular-wave voltage, namely, a first means of performing the frequency division at the stage, at which a rectangular-wave voltage is produced from the d.c. voltage, and a second means of performing the frequency division at the stage, at which a triangular-wave voltage is produced from the rectangular-wave voltage. Both of these two means may be employed in the oscillation circuit 2a.

Figure 6:
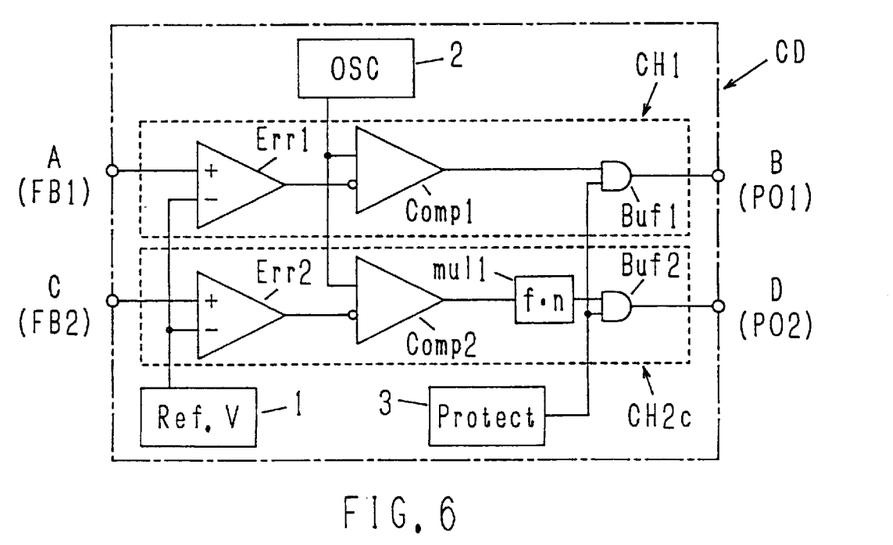
FIG. 6 is a block diagram showing a fourth embodiment of the present invention, in which a frequency multiplier circuit is connected to a control system of a power supply control device of the multi-channel type.

FIG. 6 illustrates a fourth embodiment of the present invention, namely, yet another power supply control device embodying the present invention. In the case of the power supply control device of FIG. 6, a control system CH2c has a frequency multiplier circuit mul1 in addition to an error amplifier Err2, a comparator Comp2 and an output buffer Buf2. Namely, the power supply control device of FIG. 6 performs an operation, which is reverse to the operation of the power supply control device of FIG. 3, by replacing the frequency divider circuit div1 with the frequency multiplier circuit mul1. Consequently, the power supply control device of FIG. 6 obtains two pulse output signals respectively having different frequencies, similar to the power supply control device of FIG. 3.

Namely, the frequency multiplier circuit mul1 performs a multiplication of the switching frequencies of the pulse output signals generated in the comparator Comp2. As a result, the switching frequency of a pulse output signal PO2 outputted from a terminal pin D is higher than the switching frequency of a pulse output signal PO1 outputted from a terminal pin B. Thus, the switching power supply circuit of the synchronous rectification type is driven and controlled by the control system CH1. Further, the switching power supply circuit of the ordinary rectification type is driven and controlled by the control system CH2. Thus, the switching circuit of the ordinary rectification type can be miniaturized by raising or increasing the switching frequency thereof. On the other hand, the efficiency of the switching circuit of the synchronous rectification type can be enhanced by lowering or decreasing the switching frequency thereof.

Figure 7:
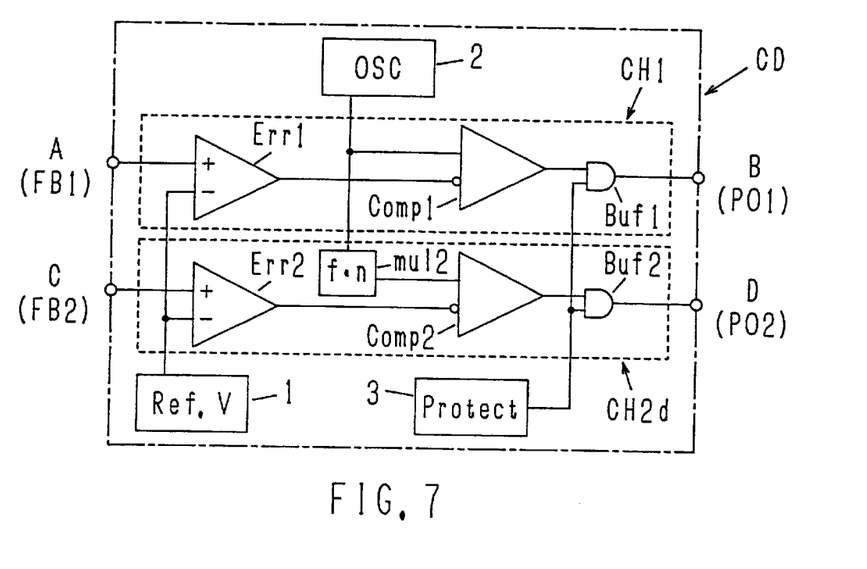
FIG. 7 is a block diagram showing a fifth embodiment of the present invention, in which a frequency multiplier circuit is connected to a control system of a power supply control device of the multi-channel type.
Figure 8:
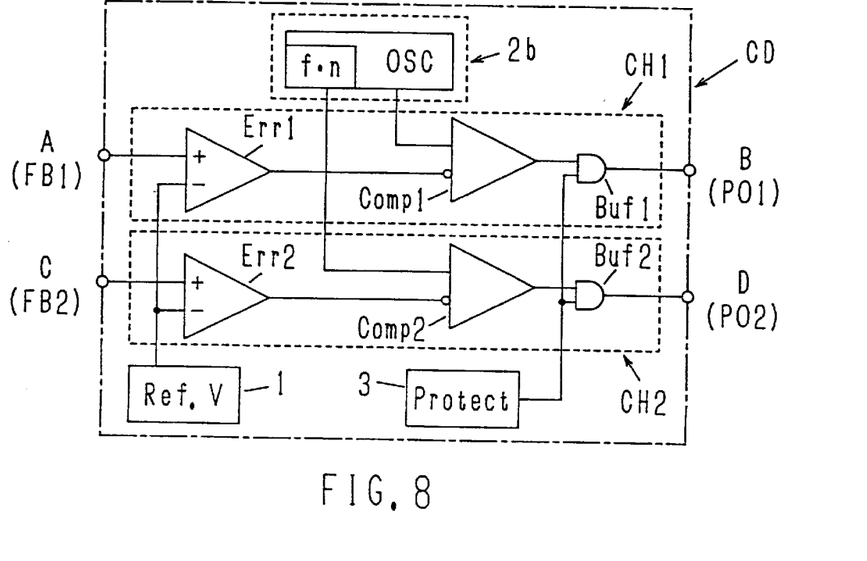
FIG. 8 is a block diagram showing a sixth embodiment of the present invention, in which a frequency multiplier means is provided in an oscillation circuit of a power supply control device of the multi-channel type.

Meanwhile, the fifth embodiment of the present invention, namely, still another power supply control device of FIG. 7 is obtained by substituting the frequency multiplier circuit mul2 for the frequency divider circuit div2 of FIG. 4. Further, the sixth embodiment of the present invention, namely, yet another power supply control device of FIG. 8 is obtained by replacing the oscillation circuit 2a of FIG. 5, to which the frequency divider circuit is added, with an oscillation circuit 2b to which a frequency multiplier means is added.

A pulse output signal PO2 outputted from a terminal pin D by the action of the frequency multiplier circuit mul2 and the oscillation circuit 2b has a pulse frequency which is higher than a pulse frequency of a pulse output signal PO1 outputted from a terminal pin B. Thus, in the control devices of FIGS. 7 and 8, operations, which are reverse to those of the control devices of FIGS. 4 and 5, are performed. Consequently, two pulse output signals respectively having two different frequencies are obtained, similarly as in the case of the control devices of FIGS. 4 and 5.

Figure 9:
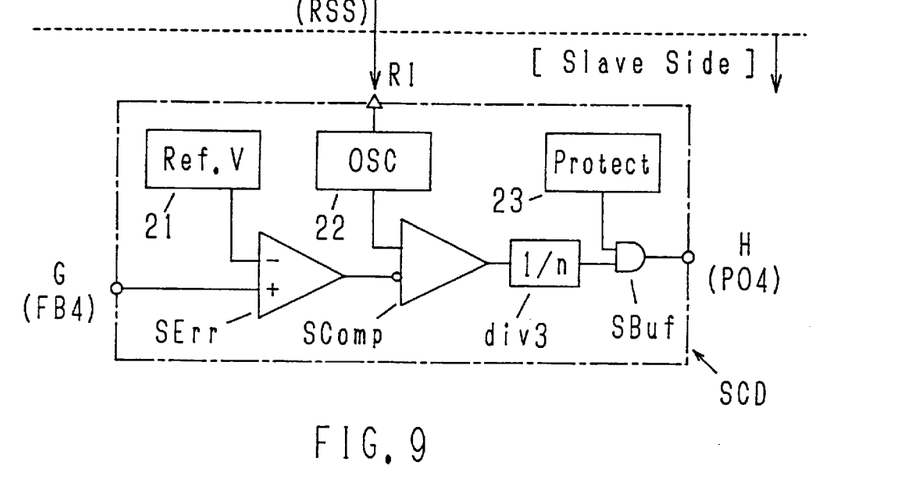
FIG. 9 is a block diagram showing a seventh embodiment of the present invention, in which a frequency divider circuit is connected to a slave power supply control device.

Referring further to FIG. 9, there is shown the seventh embodiment of the present invention, namely, still another power supply control device embodying the present invention. Differently from the embodiments of the present invention of FIGS. 3 to 8, which are of the multi-channel type similarly as in the case of the conventional power supply unit of FIG. 1, this power supply control device of FIG. 9 is of the type having a master-slave function similarly as in the case of the conventional power supply unit of FIG. 2.

The power supply control device SCD of FIG. 9 is a slave control device and has an error amplifier SErr, a comparator SComp, an output buffer SBuf and a frequency divider circuit div3 connected to an output side or terminal of the comparator SComp.

In principle, an oscillation circuit 22 receives a synchronization signal RSS from a master control device (not shown) and outputs a triangular-wave voltage similarly as an oscillation circuit of the master control device does. Thus, the frequency of the pulse output signal generated in the comparator SComp is equal to that of a pulse output signal (PO3) outputted by the master control device. The frequency divider circuit div3, however, performs a frequency division on the pulse frequency of a pulse output signal generated in the comparator SComp to thereby lower or decrease the pulse frequency. As a consequence, the pulse frequency of a pulse output signal (PO4) outputted from a terminal pin D by the power supply control device SCD of FIG. 9 is lower than the pulse frequency of a pulse output signal (PO3) outputted by the master control device or of a pulse output signal outputted by a slave control device (not shown) which operates faithfully in response to a synchronization signal outputted from the master control device.

A switching power supply circuit of the synchronous type is driven and controlled by the power supply control device SCD of FIG. 9, whose pulse output signal has a low frequency, and in contrast, a switching power supply circuit of the ordinary rectification type is driven and controlled by the master control device, whose pulse output signal has a high frequency. Then, the switching power supply circuit of the ordinary rectification type can be miniaturized by increasing or raising the switching frequency thereof, while the efficiency of the switching power supply circuit of the synchronous rectification type can be enhanced by decreasing or lowering the switching frequency.

Therefore, in the case of miniaturizing the power supply unit by raising or increasing the oscillation frequency of a triangular-wave voltage outputted from the oscillation circuit in the power supply unit in which the switching power supply circuits of the ordinary rectification type and the synchronous rectification type are placed in juxtaposition, the overall efficiency of the power supply unit can be greatly improved by the frequency divider circuit.

Incidentally, in the case of the power supply control device SCD of FIG. 9, the frequency divider circuit div3 is connected to an output terminal of the comparator SComp. In contrast, even in the case that the output terminal of the comparator SComp is connected to the output buffer SBuf and further, the frequency divider circuit div3 is connected to an output terminal of the output buffer Buf, similar effects or advantages can be obtained.

Figure 10:
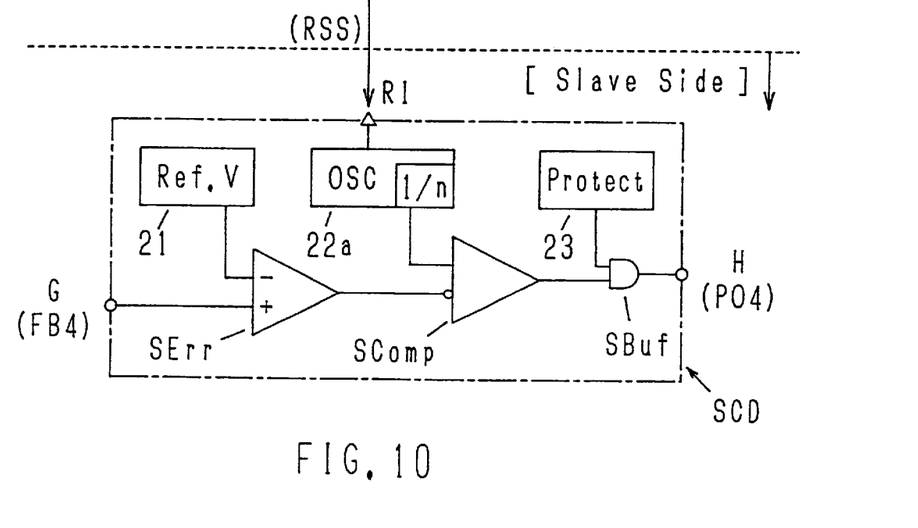
FIG. 10 is a block diagram showing an eighth embodiment of the present invention, in which a frequency divider means is provided in an oscillation circuit of a slave power supply control device.

FIG. 10 illustrates the eighth embodiment of the present invention, namely, yet another power supply control device embodying the present invention. In the case of the control device of FIG. 10, a frequency divider means is added to an oscillation circuit 22a for outputting a triangular-wave voltage in accordance with a synchronization signal sent from a master control device.

In this case, the frequency of a triangular-wave voltage inputted to a comparator SComp is lowered by the frequency divider means. Thus, the frequency of a pulse output signal PO4 generated in the comparator SComp is lower than the pulse frequency of a pulse output signal outputted by a master control unit or by another slave control device which operates faithfully in response to a synchronization signal sent from the master control device.

As a result, an operation of the power supply control device SCD of FIG. 10 is similar to the operation of the power supply control device of FIG. 9, so that the miniaturization and the increasing of the efficiency of a power supply unit can be achieved.

Incidentally, in the case of using an oscillation circuit 22a of FIG. 10, basically, the frequency division may be performed at any stage from the reception of a synchronization signal to the conversion to a triangular-wave voltage through the generation of a rectangular-wave voltage, though the suitable stage may change according to the circuit configuration (or system) and the synchronization signal received from the master control device. Additionally, instead of integrally mounting the frequency divider circuit with the oscillation circuit, the frequency divider circuit may be formed separately from the oscillation circuit. Further, the frequency divider circuit may be provided at a synchronization-signal receiving side terminal of the oscillation circuit or at a triangular-wave-voltage-signal outputting side terminal thereof.

Figure 11:
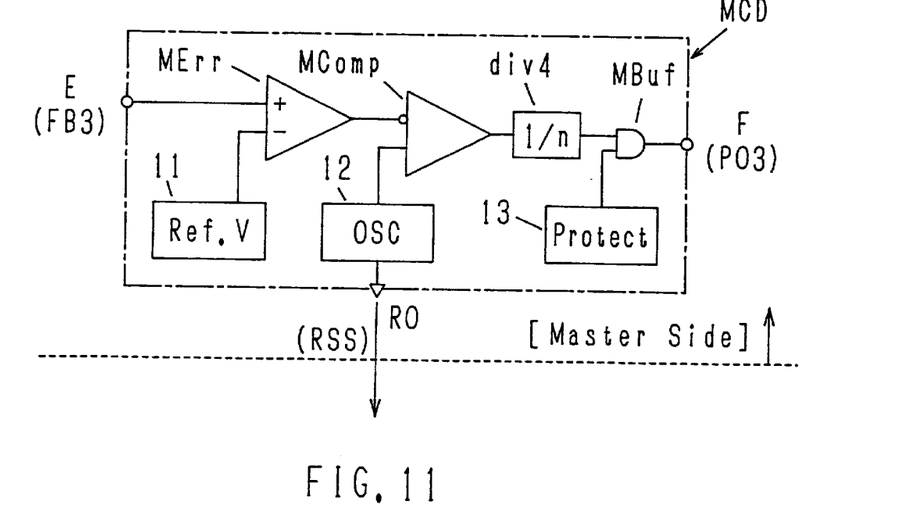
FIG. 11 is a block diagram showing a ninth embodiment of the present invention, in which a frequency divider circuit is connected to a master power supply control device.
Figure 12:
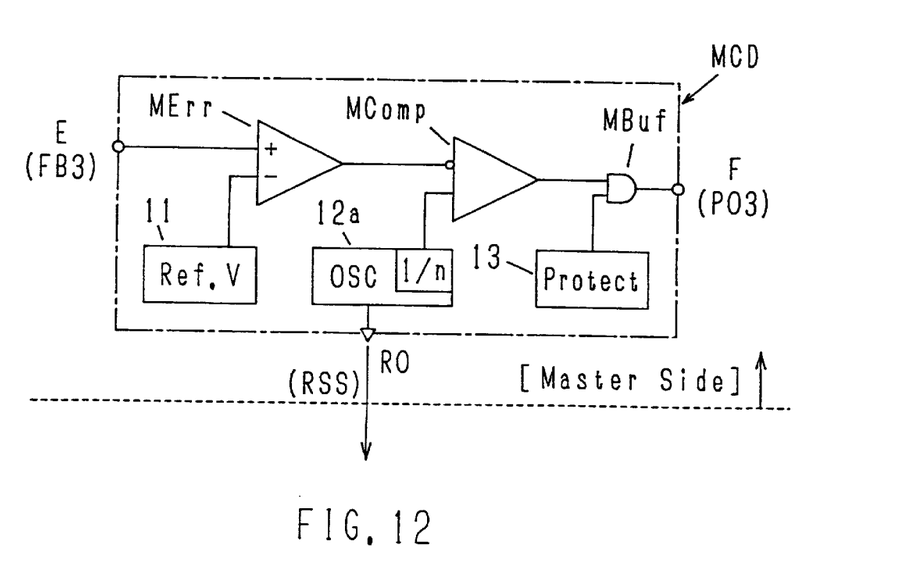
FIG. 12 is a block diagram showing a tenth embodiment of the present invention, in which a frequency divider means is provided in an oscillation circuit of a master power supply control device.

FIGS. 11 and 12 illustrate the ninth embodiment and the tenth embodiment of the present invention, respectively, namely, other power supply control devices embodying the present invention. In the cases of the aforementioned control devices of FIGS. 9 and 10, the frequency divider circuit div3 is connected to the power supply control device acting as a slave control device, and the frequency divider means is provided in the oscillation circuit 22a. In contrast, in the cases of the control devices of FIGS. 11 and 12, the frequency divider circuit is connected to the power supply control device serving as a master control device, and the frequency divider means is provided in the oscillation circuit.

In the case of the power supply control device MCD of FIG. 11, a frequency divider circuit div4 is connected to an output side or terminal of a comparator MComp of the control system, similarly as in the case of the power supply control device SCD of FIG. 9.

In the oscillation circuit 12 of FIG. 11, the frequency of a synchronization signal RSS supplied to a slave control device is equal to that of a triangular-wave voltage supplied to the comparator Mcomp. Therefore, the pulse frequency of a pulse output signal generated in the comparator MComp of FIG. 11 is equal to that of a pulse output signal outputted by the slave control device which operates in accordance with a synchronization signal. However, because the frequency division is performed on the pulse frequency of the pulse output signal by the frequency divider circuit div4, the frequency of the pulse output signal PO3 outputted from a terminal pin F is lower than that of the pulse output signal outputted by the slave control device.

In the case of the power supply control device MCD of FIG. 12, a frequency divider means is added to the oscillation circuit 12a, similarly as in the case of the power supply control device SCD of FIG. 10.

Here, in the case of the oscillation circuit 12a to which the frequency divider means is added, the frequency of a triangular-wave voltage to be fed to the comparator MComp is set in such a way as to be lower than that of the synchronization signal RSS to be supplied to a slave control device (not shown). Thereby, the pulse frequency of the pulse output signal PO3 outputted from the power supply control device MCD of FIG. 12 is lower than that of the pulse output signal outputted by the slave control device which operate according to the synchronization signal RSS.

Figure 13:
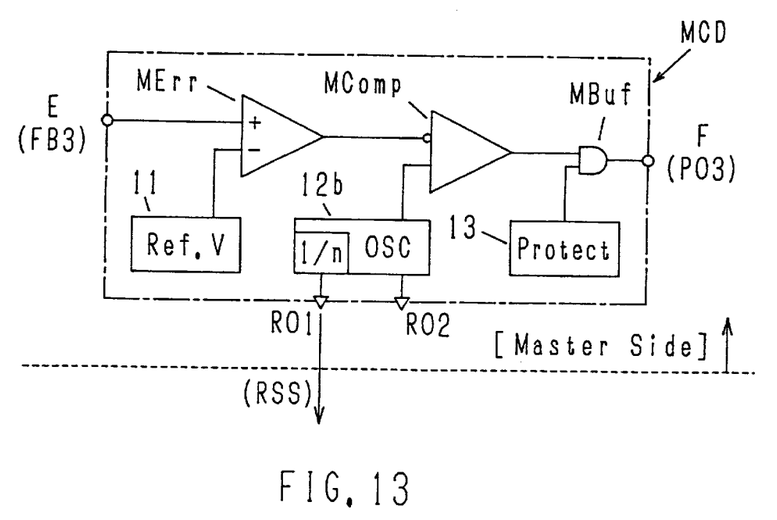
FIG. 13 is a block diagram showing an eleventh embodiment of the present invention, in which a frequency divider means is provided in an oscillation circuit of a master power supply control device.

FIG. 13 illustrates the eleventh embodiment of the present invention, namely, another power supply control device embodying the present invention. In the case of this power supply control device MCD of FIG. 13, a frequency divider means is added to an oscillation circuit 12b. Further, the frequency of a synchronization signal RSS to be supplied to a slave control device is set in such a manner as to be lower than that of a triangular-wave voltage to be supplied to a comparator MComp, in contrast with the control device of FIG. 12. Incidentally, assuming that there are a plurality of slave control devices (not shown) and power supply control devices used for switching power supply circuits of the ordinary rectification type and power supply control devices used for switching power supply circuits of the synchronous rectification type coexist, the control device of FIG. 13 is adapted so that both of a high-frequency synchronization signal RO1 and a low-frequency synchronization signal RO2 can be obtained from the oscillation circuit 12b.

FIGS. 14 to 18 illustrate the twelfth to sixteenth embodiments of the present invention, respectively.

In the case of the power supply control devices of FIGS. 9 to 13, the pulse frequency of a pulse output signal outputted from one of master and slave control devices is changed by a frequency divider circuit or a frequency divider means. Power supply control devices of FIGS. 14 to 18 are adapted so that the pulse frequency of a pulse output signal of one of the master and slave control circuits is changed by using frequency multiplier circuits (or means) instead of these frequency divider circuits (or means).

Figure 14:
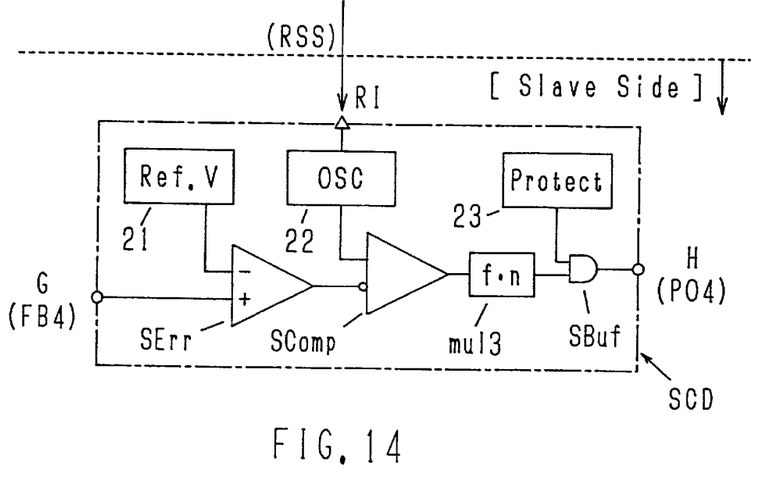
FIG. 14 is a block diagram showing a twelfth embodiment of the present invention, in which a frequency multiplier circuit is connected to a slave power supply control device.

Namely, the control device of FIG. 14 is a slave control device SCD in which a frequency multiplier circuit mul3 is connected to an output terminal of a comparator SComp.

Figure 15:
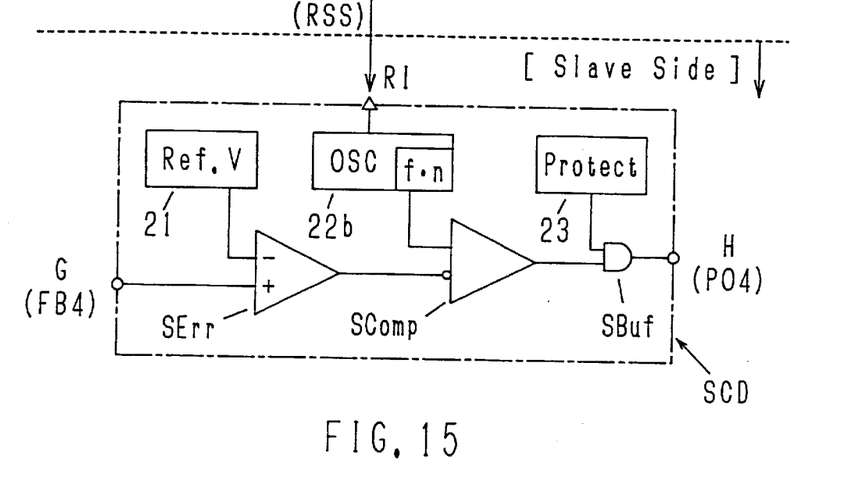
FIG. 15 is a block diagram showing a thirteenth embodiment of the present invention, in which a frequency multiplier means is provided in an oscillation circuit of the slave power supply control device.

Further, the control device of FIG. 15 is a slave control device SCD employing an oscillation circuit 22b, to which a frequency multiplier means is added, as the oscillation circuit.

Figure 16:
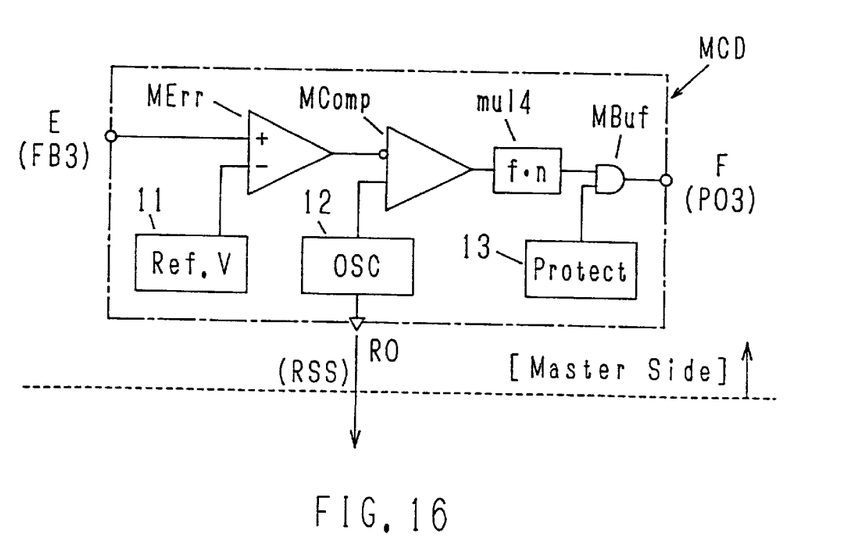
FIG. 16 is a block diagram showing a fourteenth embodiment of the present invention, in which a frequency multiplier circuit is connected to a master power supply control device.

The control device of FIG. 16 is a master control device MCD in which a frequency multiplier circuit mul4 is connected to an output terminal of a comparator MComp.

Figure 17:
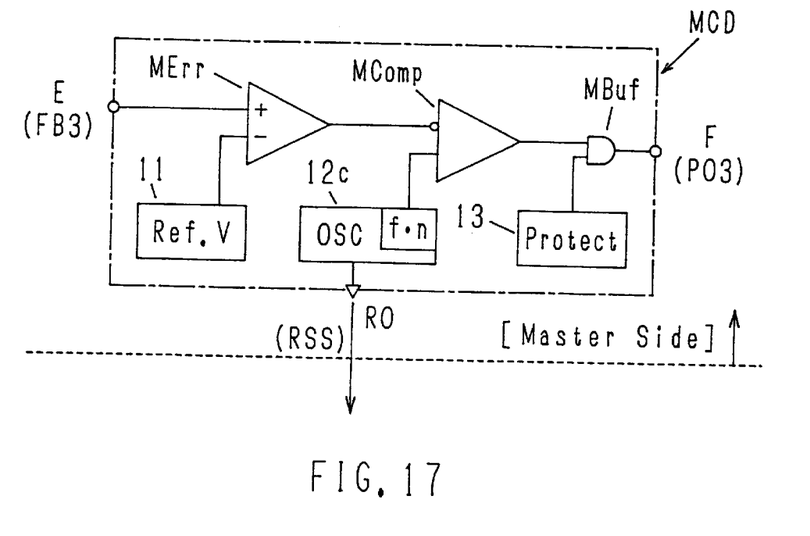
FIG. 17 is a block diagram showing a fifteenth embodiment of the present invention, in which a frequency multiplier means is provided in an oscillation circuit of a master power supply device.

The control device of FIG. 17 is a master control device MCD in which an oscillation circuit 22c, to which a frequency multiplier means is added, as an oscillation circuit.

Figure 18:
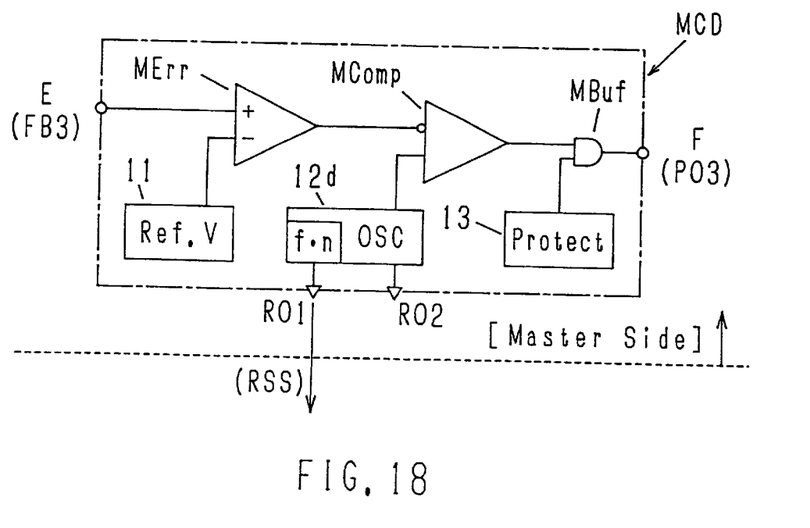
FIG. 18 is a block diagram showing a sixteenth embodiment of the present invention, in which a frequency multiplier means is provided in an oscillation circuit of a master power supply device.

The control device of FIG. 18 is a master control device MCD in which an oscillation circuit 22d, to which a frequency multiplier means is added, as an osillation circuit. Incidentally, in the case of the control device of FIG. 17, the multiplication of the frequency of a triangular-wave voltage is performed. In contrast, in the case of the control device of FIG. 18, the multiplication of the frequency of the synchronization signal RSS to be supplied to a slave control device is performed. The control device of FIG. 18 is different in this respect from the control device of FIG. 17.

In the case of operations of the power supply control devices of FIGS. 14 to 18, the pulse frequency is set in such a manner as to be high, in comparison with the case of the power supply control devices of FIGS. 9 to 13 in which the pulse frequency is set in such a way as to be low. The remaining operations, namely, the fundamental control operations of the power supply control devices of FIGS. 14 to 18 are similar to the corresponding operations of the power supply control devices of FIGS. 9 to 13. Therefore, the description of the remaining operations of the control devices of FIGS. 14 to 18 is omitted herein.

Incidentally, in the foregoing description of the embodiments of the present invention of FIGS. 3 to 8, the control devices, each of which contains two control systems, have been described as examples of the power supply control devices of the multi-channel type. The present invention, however, is not limited to these embodiments. Needless to say, the present invention can be applied to a control device provided with an arbitrary (or unspecific) number of control systems. Similarly, in the description of the embodiments of the present invention of FIGS. 9 to 18, it is assumed that the power supply control device is of the single-channel type provided with a single control system. However, the power supply control device of the multi-channel type provided with two control systems or more may be used instead of the power supply control device of the single-channel type.

Further, the power supply unit, which is provide with an arbitrary or unspecific number of power supply circuits, may have a plurality of control devices, each of which is provided with a frequency divider means or a frequency multiplier means. In such a case, there is no necessity to set the frequency division ratios of the frequency divider means or the frequency multiplication ratio of the frequency multiplier means at a uniform value. Namely, the frequency division ratios or the frequency multiplication ratios may be set in accordance with the characteristics of switching power supply circuits to be driven and controlled.

As described-above, in the case of the power supply control devices of the multi-channel type or having the master-slave function, frequency divider means or frequency multiplier means are provided in a predetermined control system (or a predetermined control unit) or predetermined oscillation means. Thus, a plurality of pulse output signals of different frequencies, which fit characteristics of a switching power supply circuit and whose operation timings are synchronized, are obtained.

Thereby, a plurality of switching power supply circuits of different properties, for example, switching power supply circuits of the ordinary rectification type and the synchronous rectification type can be driven and controlled under suitable switching conditions respectively corresponding thereto. Moreover, a low frequency switching beat can be prevented from occurring in the control device and in the power supply unit.

Consequently, when applying the control device of the present invention to a power supply unit, both of the miniaturization and the increasing of the efficiency of a power supply unit can be attained by achieving a good balance therebetween without trading off one of the miniaturization and the increasing of the efficiency thereof.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A pulse-width modulation power supply control device of a multi-channel type, comprising:

an oscillator providing an output signal having a predetermined frequency;

a plurality of control systems providing respective pulse output signals for respectively controlling a plurality of power supply circuits independently of one another, said plurality of control systems receiving said oscillator output signal to synchronize said pulse output signals; and a frequency multiplier means coupled to at least one of said plurality of control systems for changing a pulse frequency, without changing on-duty time, of the pulse signal of said at least one control system by n time, where n>1.

2. A pulse-width modulation power supply control device of a multi-channel type, comprising:

an oscillator providing an output signal having a predetermined frequency;

a plurality of control systems providing respective pulse output signals for respectively controlling a plurality of power supply circuits independently of one another, said plurality of control systems receiving said oscillator output signal to synchronize said pulse output signals; and a frequency multiplier means coupled to at least one of said plurality of control systems for setting at least one first control system from among said plurality of control systems to produce a predetermined frequency pulse output signal and for setting at least one second control system from among said plurality of control systems to produce a pulse output signal having a frequency higher than said predetermined frequency.

3. The power supply control device of claim 2, wherein said at least one first control system includes means for independently driving a power supply circuit adapted to a synchronous rectification system.

* * * * *